Sept. 19, 1939.  B. WHEELER  2,173,318

STEAM CHARGING DEVICE FOR UNFIRED PRESSURE VESSELS

Filed April 14, 1937

Brian Wheeler
INVENTOR.

BY
ATTORNEYS.

Patented Sept. 19, 1939

2,173,318

UNITED STATES PATENT OFFICE 2,173,318

STEAM CHARGING DEVICE FOR UNFIRED PRESSURE VESSELS

Brian Wheeler, Beloit, Wis., assignor to Heisler Locomotive Works, Erie, Pa., a corporation of Pennsylvania Application April 14, 1937, Serial No. 136,959

2 Claims. (Cl. 122—35)

Unfired pressure vessels are in common use, particularly for locomotives, and the boiler proper or tank on such locomotives is charged at intervals with high pressure steam storing sufficient energy for the required length of operation of the locomotive. Ordinarily the tank in these fireless devices is filled up rather more than half full of water and the steam is delivered into the body of water at one or more points to facilitate the conversion of the steam as rapidly as possible as it enters the tank.

The present invention is designed to improve the manner of introducing the steam. This it does by providing a large number of delivery outlets for the steam so arranged that a current in a definite direction is set up in the mass of water. This arrangement ensures a rapid condensation of the steam and provides that the rising temperature of the water shall be the same in all parts of the tank. Features and details of the invention will appear from the specification and claims.

A preferred embodiment of the invention is illustrated in the accompanying drawing as follows.

Figure 1:
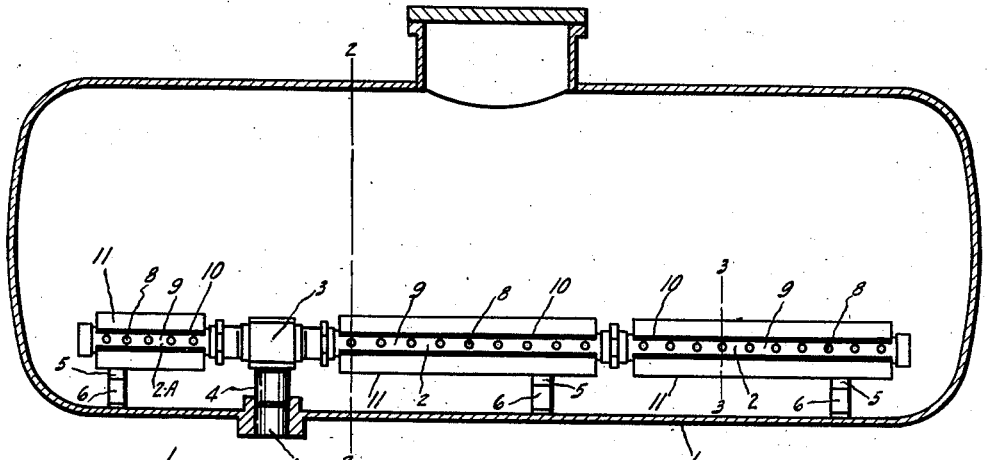
Fig. 1 shows a vertical section extending longitudinally through the tank on the line 1—1 in Fig. 2.
Figure 2:
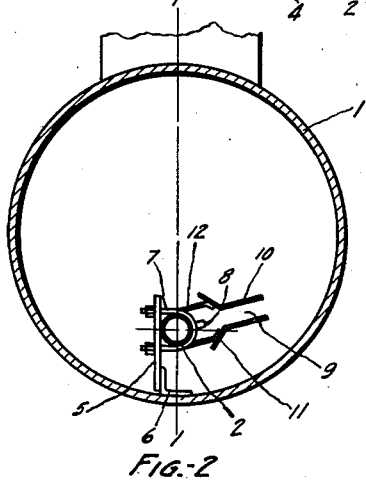
Fig. 2 is a section on the line 2—2 in Fig. 1.
Figure 3:
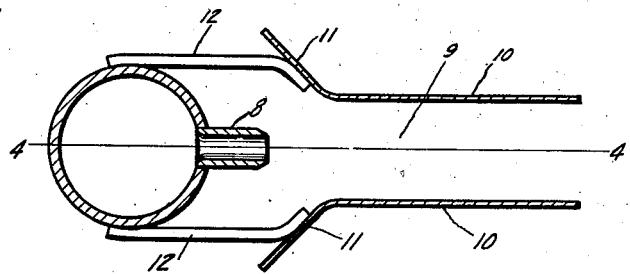
Fig. 3 shows an enlarged view in section on the line 2—2 in Fig. 1.
Figure 4:
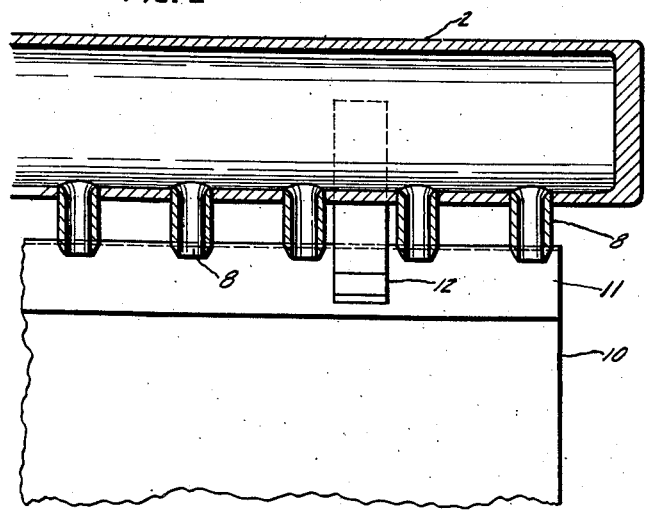

Fig. 4 a section on the line 4—4 in Fig. 3.

1 marks an enclosed tank. Arranged in this tank is a charging manifold having oppositely extending sections 2 and 2a. A T-fitting 3 leads to the manifold sections, and a charging inlet opening 4 leads to the fitting. Posts 5 extend upwardly from the bottom of the tank at intervals and are secured to the wall of the tank by angle plates 6. U-shaped clamps 7 extend around the manifold and through the post 5 for securing and supporting the manifold in the tank.

Steam is delivered from the manifold through nozzles 8. These nozzles are arranged at short intervals along the manifold and are so directed as to induce a flow circumferentially of the tank. The nozzles discharge into a current inducing passage 9 arranged between side walls 10. The side walls 10 extend longitudinally along the manifold and are provided with inclined edges next to the manifold which form a graduated intake for the passage 9. The walls 10 are supported by arms 12 secured to the inclined edges 11 and the walls of the manifold.

The use of the elongated or continuous inducing passage makes it possible to supply a large number of nozzles in the manifold so that practically the whole length of the passage is active, imposes very little restriction on the outflow of steam, and provides a rugged, simple and inexpensive structure.

It will be noted that the passage 9 formed by the plates provides a converging wall at the inlet side of the passage and that the passage is extended by the walls from the throat formed by the converging walls toward the outlet side of the passage without substantially restricting the passage from the throat. In other words, there is a substantial Venturi effect in the arrangement of the passage.

What I claim as new is:

1. In an unfired pressure vessel, the combination of a tank; a steam charging manifold arranged in the tank, said manifold having a series of steam jet openings; and a shroud with elongated side walls forming a passage the center of which is in substantial alinement with the direction of the jets and the inlet and discharge of the passage in ejector relation to the jets, the walls of the passage at the inlet side converging to form a throat and being continued beyond the throat without substantial restriction of the passage from the throat to the outlet.

2. In an unfired pressure vessel, the combination of a tank; a steam charging manifold arranged in the tank, said manifold having a series of steam jet openings; and a shroud with elongated side walls forming a passage the center of which is in substantial alinement with the direction of the jets and the inlet and discharge of the passage in ejector relation to the jets, the walls of the passage in its flow-inducing portion being arranged at not to exceed 45° to the plane of the jets, the passage being tangentially directed with relation to the walls of the tank.

BRIAN WHEELER.